April 16, 1940.  J. EGGERT ET AL  2,197,466
ELECTROMAGNETIC APPARATUS FOR CONTROLLING BEAMS OF LIGHT
Filed Nov. 5, 1937  2 Sheets-Sheet 1
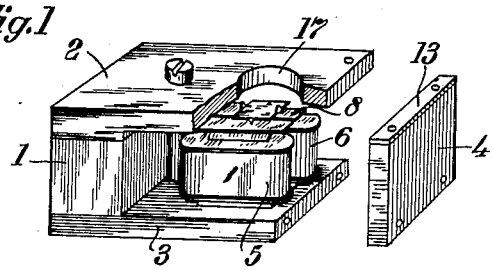
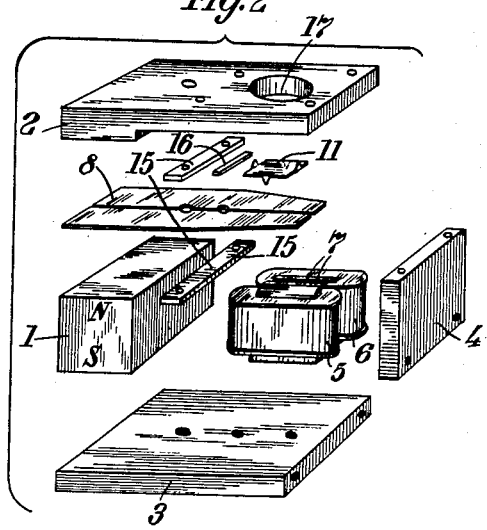
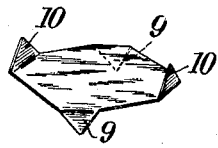 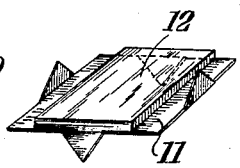 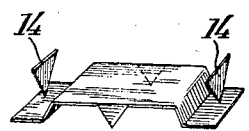
John Eggert
Hans Friedrich Nissen
Inventors
By Their Attorneys April 16, 1940. J. EGGERT ET AL 2,197,466
ELECTROMAGNETIC APPARATUS FOR CONTROLLING BEAMS OF LIGHT
Filed Nov. 5, 1937 2 Sheets-Sheet 2
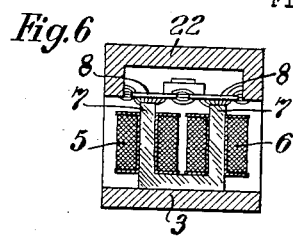
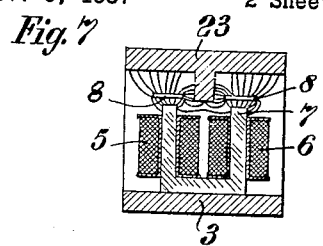
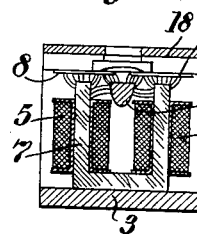
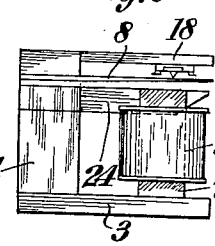
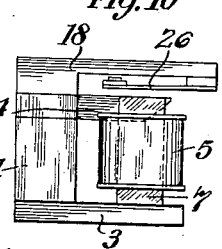
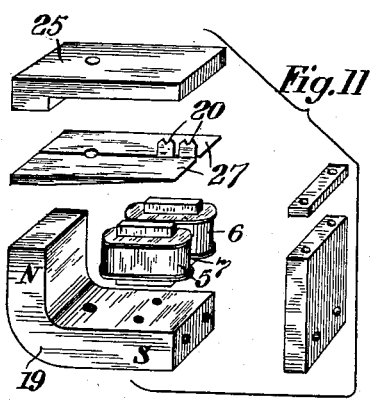
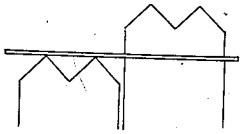
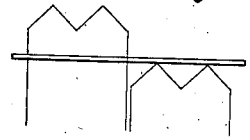
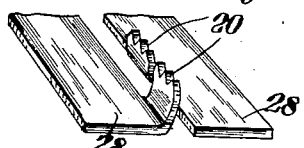
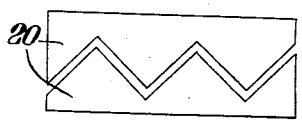
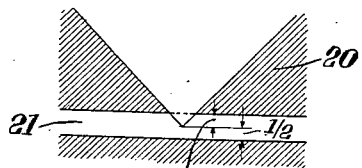
John Eggert
Hans Friedrich Nissen  Inventors
By Their Attorneys Patented Apr. 16, 1940

2,197,466

UNITED STATES PATENT OFFICE 2,197,466

ELECTROMAGNETIC APPARATUS FOR CONTROLLING BEAMS OF LIGHT

John Eggert, Leipzig, and Hans Friedrich Nissen, Dessau, Germany, assignors to I. G. Farbenindustrie Aktiengesellschaft, Frankfort-on-the-Main, Germany Application November 5, 1937, Serial No. 172,972
In Germany November 7, 1936

5 Claims. (Cl. 88—61)

Our present invention relates to an apparatus for controlling beams of light.

One of its objects is to provide an apparatus for controlling a beam of light by means of a two-pole electro-magnetic controlling system and a permanently magnetized oscillating device. Further objects of this invention will be understood from the following detailed description of the same.

Apparatus having a two-pole electromagnet are known which consist in a magnet having on its ends coils through which the controlling currents flow, whereby a permanent magnetic field is augmented or diminished. This determines the application of a varying force to an armature which can be used to control the light beam. Further apparatus are known in which a coil is mounted on an iron core one end of which is arranged in the middle of a magnet and the other end is close to a movable mirror support which is near the two poles of the magnet. In all these apparatus, however, the magnetic circuit of the alternating magnetic field flows through the steel magnet. This is a disadvantage, since the steel has a reversible small permeability and offers a high resistance to variations in magnetization. Furthermore eddy currents are set up.

These disadvantages are minimized or avoided by the present invention, wherein the oscillating device is arranged in such a manner that the circuit for the magnetic flux due to the electromagnet is completed only through the oscillating device. The latter may advantageously consist of two parts placed respectively opposite to the two poles of the electromagnet, so that when the controlling currents flow through the field coils one part is attracted and the other repelled. The parts of the oscillating device may have the form of tongues, one end of each being fixed to the permanent magnet, the other ends are placed respectively opposite to the two poles of the electromagnet. The resonant frequency of the tongues depends mainly on their free length, and may be varied by a displaceable bridge.

The device for controlling the light beam may be a mirror, which is supported on both the parts of the oscillating device, so that the varying magnetic field causes the mirror to rotate. Alternatively a diaphragm with one or more serrations may be fixed to each tongue. If these diaphragms are placed contiguously to one another they can be used to produce a push pull track.

The invention is illustrated by the accompanying drawings.

Fig. 1 is a side elevation of one form of apparatus with parts removed.

Fig. 2 is a perspective view with the parts separated.

Figures 3, 4, and 5 show perspective views of different forms of the mirror.

Figure 6, 7, and 8 are cross-sections of devices showing different shaped pole pieces.

Figures 9 and 10 are side views of devices with a pole piece as shown in Figure 8.

Figure 11 is an exploded view of a modification.

Figure 12 is a perspective view of a modified light controlling element.

Figure 13a to Figure 13d are diagrams for explaining a method of control.

Fig. 14 is a diagram that shows another arrangement of the light control elements.

Referring to Figures 1 and 2, a permanent magnet 1 has two pole pieces 2 and 3. Between the magnet 1 and the pole piece 2 there are fixed two tongues 8 which are magnetized by the magnet 1. A two-pole electromagnet is placed on the pole piece 3; the controlling currents flow through the coils 5, 6. The free end of each tongue 8 is situated above one pole 7 of the electromagnet. The coils 5, 6 are so wound and connected that when a north pole is produced in one limb a south pole is produced in the other, and vice versa. The field of the electromagnet and that of the permanent magnet will together cause one of the tongues 8 to be attracted to and the other to be repelled from the electro-magnet. Thus the free ends of the two tongues move in opposite directions. A mirror 11 is supported by knife edges on the ends of both tongues 8, and turns as these ends move in opposite directions. This turning is used to control a beam of light reflected by the mirror.

The connection between the mirror and the ends of the tongues can be of various kinds. It may be directly on the tongues or on a mirror support, the mirror or support having projections, for example knife edges or points, which rest on the tongues. The mirror support preferably rests in cavities in the pole piece 2. In Figure 3, for example, a mirror support is shown having corners 9 bent downwards to bear on the tongues, and corners 10 bent upwards to fit in cavities in the pole piece 2.

Figure 4 shows a support 11 for a rectangular mirror 12. In all these examples the tongues 8 can be adapted to hold the mirror or mirror support between themselves and the pole piece without the necessity for any further expedient. For adjusting the distance between the two pole pieces and the tongues a distance piece 4 with a shim 13 adapted to be screwed on to the pole pieces, or a distance screw, can be used. Instead of the arrangement shown in Figure 3 in which the corners 10 engage in cavities in the pole piece 2, projections 14, as shown in Figure 5, may be fixed to the pole piece, and bear on the mirror or mirror support. In this case all points on which the mirror or the mirror support is adapted to turn are in one plane. Thus the points need perform the least necessary movements.

The resonant frequency of the tongues 8 can be adjusted by a bridge 15. The amplitude of the vibrations can be restricted to the desired extent by a suitable piece 16 of damping material.

The pole piece 2 is perforated as at 17 for passage of the light beam to be controlled.

There should be no appreciable alteration in the reluctance of the circuit for the permanent field as the deflections of the tongues 8 vary. In order to reduce the alteration to a minimum the distance between the pole piece 2 and the tongues 8 is made large compared with that between the tongues and the pole pieces of the electromagnet 7; the variation is further reduced by ensuring that the flux enters the edges of the tongues from the side. This can be procured by proper design of the pole pieces 2, and Figures 6 to 10 show examples of such design.

In Figure 6 the pole piece 22 is U-shaped, so that the permanent field flux enters the edges of the tongues 8 as shown by the lines of force. In Figure 7 the pole piece 23 is T-shaped.

In Figures 8 to 10 the pole piece 24 is shown underneath the tongues 8 and 26 respectively. The lines of force are shown in Figure 8. The part 18 serves the purpose of providing a counter-support for the mirror. In Figure 10 the tongues 26 are shown attached not to the magnet 1 but to the part 18.

In the apparatus described the circuit of the variable flux is solely through parts which can be made of thin sheets of material of suitably high reversible permeability, of which the tongues can also be made. The smaller natural frequency which tongues of such material would have in comparison with a tongue of like dimensions made of steel can be compensated by properly shaping the tongues. It is advantageous for the flux to pass through the tongues transversely to their axis since the cross-section of the bundles of magnetic lines is then larger while their length is reduced to a minimum; further the cross-section of the air-gap is large and it therefore has a small reluctance.

Figure 11 shows apparatus which is similar to those already described, but in which the bent magnet 19 takes the place of the magnet 1 and pole piece 3, and diaphragms 20 that of the mirror. The whole piece 25 corresponds with element 2 of Figs. 1 and 2. The diaphragms fixed to tongues 27 and 28 may have one or more serrations and are placed with their adjacent edges contiguous as shown in Figs. 11 and 12 respectively.

With this apparatus it is possible to make a push pull track which can also be arranged as a track of diminished ground noise. The method of control is explained by Figures 13a to 13d. Figure 13a shows the position of rest in which the beam of light 21 is adjusted so that the lower apices of the serrations of the diaphragms 20 lie on the centre line of the beam of light as shown in Figure 13d. Figure 13b shows the maximum deflection of the diaphragms in one direction and Figure 13c that in the opposite direction. It is to be observed that at any given moment only one side of the track is illuminated, while the other side remains dark. If the sound track is to be reproduced on a reversal film, the beam of light must be so displaced that the upper, instead of the lower, apices of the serrations lie on the centre line of the beam. Hereby the smallest distortions of the sound recording are obtained, since in the first place the exposure follows a quadratic variation of light. This is effected on both sides of the track, and not until one diaphragm has completely obscured its side of the track does the variation in exposure follow the desired linear law.

Instead of the diaphragms being arranged to produce the push pull track as described, they may be fixed to the tongues in such a manner that their serrations interpenetrate as shown in Figure 14. In this case the usual multi-edge variable width sound track is obtained.

What we claim is:

1. In an apparatus for controlling a beam of light in combination a permanent magnet comprising two pole pieces, two electro-magnets arranged between said pole pieces, each of said electro-magnets having a free end, said electro-magnets being traversed by the controlling currents in such a manner that said free ends are oppositely magnetized, two parallel separate tongues adjacent to each other and arranged opposite to said free ends, means for affecting the beam of light carried by said tongues, and means for damping the amplitude of the vibrations of said tongues arranged on said tongues.

2. In an apparatus for controlling a beam of light in combination a permanent magnet comprising two pole pieces, two electro-magnets arranged between said pole pieces, each of said electro-magnets having a free end, said electro-magnets being traversed by the controlling currents in such a manner that said free ends are oppositely magnetized, two parallel separate tongues adjacent to each other and arranged opposite to said free ends, means for affecting the beam of light carried by said tongues, means for damping the amplitude of the vibrations of said tongues arranged on said tongues, and means on said tongues for varying the resonant frequency.

3. In an apparatus for controlling a beam of light in combination a permanent magnet comprising two pole pieces, two electro-magnets arranged between said pole pieces, each of said electro-magnets having a free end, said electro-magnets being traversed by the controlling currents in such a manner that said free ends are oppositely magnetized, two parallel separate tongues adjacent to each other and arranged opposite to said free ends, a mirror carried by said tongues, means for damping the amplitude of the vibrations of said tongues arranged on said tongues, and means on said tongues for varying the resonant frequency.

4. In an apparatus for controlling a beam of light in combination a permanent magnet comprising two pole pieces, two electro-magnets arranged between said pole pieces, each of said electro-magnets having a free end, said electro-magnets being traversed by the controlling currents in such a manner that said free ends are oppositely magnetized, two parallel separate tongues adjacent to each other and arranged opposite to said free ends, each of said tongues carrying a diaphragm with at least one serration, means for damping the amplitude of the vibrations of said tongues arranged on said tongues, and means on said tongues for varying the resonant frequency.

5. In an apparatus for controlling a beam of light in combination a permanent magnet comprising two pole pieces, two electro-magnets arranged between said pole pieces, each of said electro-magnets having a free end, said electro-magnets being traversed by the controlling currents in such a manner that said free ends are oppositely magnetized, two parallel separate tongues adjacent to each other and arranged opposite to said free ends, each of said tongues carrying a diaphragm with at least one serration, said diaphragms being placed contiguously to each other, means for damping the amplitude of the vibrations of said tongues arranged on said tongues, and means on said tongues for varying the resonant frequency.

JOHN EGGERT.
HANS FRIEDRICH NISSEN.